(12) United States Patent
Wilson et al.

(10) Patent No.: US 6,718,413 B1
(45) Date of Patent: Apr. 6, 2004

(54) CONTENTION-BASED METHODS FOR GENERATING REDUCED NUMBER OF INTERRUPTS

(75) Inventors: Andrew W. Wilson, Fremont, CA (US); Darren R. Busing, Milpitas, CA (US); B. Arlen Young, Palo Alto, CA (US); Trung S. Luu, San Jose, CA (US)

(73) Assignee: Adaptec, Inc., Milpitas, CA (US)

( * ) Notice: Subject to any disclaimer, the term of this patent is extended or adjusted under 35 U.S.C. 154(b) by 431 days.

(21) Appl. No.: 09/650,774

(22) Filed: Aug. 29, 2000

Related U.S. Application Data

(60) Provisional application No. 60/151,699, filed on Aug. 31, 1999.

(51) Int. Cl.$^7$ .............................................. G06F 13/24
(52) U.S. Cl. ..................... 710/260; 710/261; 710/262; 710/263; 710/264; 710/265; 710/266; 710/267; 710/268; 710/269; 710/48; 709/223
(58) Field of Search ................................ 710/260–269, 710/48, 5, 15, 29, 33, 36, 208; 709/223

(56) References Cited

U.S. PATENT DOCUMENTS

| | | | | |
|---|---|---|---|---|
| 3,643,229 A | * | 2/1972 | Stuebe et al. | 710/264 |
| 3,789,365 A | * | 1/1974 | Jen et al. | 710/264 |
| 4,250,546 A | * | 2/1981 | Boney et al. | 710/262 |
| 4,342,082 A | * | 7/1982 | Brown et al. | 710/264 |
| 5,363,506 A | * | 11/1994 | Fukuoka | 710/267 |
| 5,708,814 A | * | 1/1998 | Short et al. | 710/260 |
| 5,708,817 A | * | 1/1998 | Ng et al. | 710/266 |
| 5,761,427 A | * | 6/1998 | Shah et al. | 709/223 |
| 5,797,037 A | * | 8/1998 | Ecclesine | 710/48 |
| 5,881,296 A | * | 3/1999 | Williams et al. | 710/263 |
| 6,115,779 A | * | 9/2000 | Haubursin et al. | 710/262 |
| 6,185,639 B1 | * | 2/2001 | Kailash et al. | 710/48 |
| 6,192,440 B1 | * | 2/2001 | Lowe et al. | 710/260 |
| 6,219,727 B1 | * | 4/2001 | Kailash et al. | 710/48 |
| 6,266,732 B1 | * | 7/2001 | Chen et al. | 710/263 |
| 6,279,051 B1 | * | 8/2001 | Gates et al. | 710/20 |
| 6,298,403 B1 | * | 10/2001 | Suri et al. | 710/100 |

OTHER PUBLICATIONS

Morris Mano, Computer System Architecture, 1982, Prentice–Hall, Inc., 2nd Ed., pp 434–440.*

* cited by examiner

*Primary Examiner*—Gopal C. Ray
*Assistant Examiner*—Justin King
(74) *Attorney, Agent, or Firm*—Martine & Penilla, LLP

(57) ABSTRACT

Contention-based method and system are provided for generating reduced number of interrupts upon completing one or more commands. Each interrupt indicates the availability of data for transfer from a host adapter to a processor. The host adapter is coupled to one or more I/O devices over a bus. One or more I/O commands are received for transferring data between the processor and one or more I/O devices. Then, the contention for the bus among the I/O devices is monitored to determine how many devices are arbitrating for the bus.

28 Claims, 8 Drawing Sheets

CONTENTION-BASED METHODS FOR GENERATING REDUCED NUMBER OF INTERRUPTS

CROSS REFERENCE TO RELATED APPLICATION

The present application claims benefit of U.S. Provisional Patent Application No. 60/151,699, entitled "Contention-based Methods for Generating Reduced Number of Interrupts," by Andrew W. Wilson et al., filed on Aug. 31, 1999. This application is incorporated herein by reference.

BACKGROUND OF THE INVENTION

1. Field of the Invention

This invention relates generally to computer systems implementing interrupts, and more particularly to methods for generating interrupts in a host adapter for transferring data to host computer.

2. Description of the Related Art

Modern computer systems often utilize one or more buses to connect to peripheral devices to enhance its resources. For example, the resources of a computer system may be substantially increased by attaching one or more peripheral devices such as disk drives, tape drives, printers, scanners, optical drives, CD-ROM, DVD-ROM, and the like. Generally, the peripheral devices are attached to the computer system by means of a bus (e.g., cable).

One of the most popular buses is the well known small computer systems interface (SCSI) bus, which is defined in conformity with SCSI protocols (e.g., SCSI-1, SCSI-2, SCSI-3, etc.), which are incorporated herein by reference. The SCSI protocols are designed to provide an efficient peer-to-peer I/O interface between a host computer system and its peripheral devices. A SCSI bus may accommodate a plurality of SCSI devices up to :a number equal to the number of data bits in the SCSI bus. For example, the narrow SCSI-2 bus may accommodate up to eight devices, of which one is usually a SCSI host adapter.

The SCSI host adapter is typically provided between a processor and one or more SCSI devices ito facilitate transfer and conversion of data and control signals. FIG. 1 illustrates a block diagram of an exemplary computer system 100 having a host computer 102 coupled to a plurality of SCSI devices 112 by means of a SCSI bus 114. The host computer 102 includes a host bus 104, a processor 106, a memory 108, and a SCSI host adapter 110. The processor 106 is coupled to the bus 104 (e.g., ISA bus, EISA bus, PCI bus, etc.) for processing information such as data and instructions. The memory 108 is also coupled to the bus 104 for storing and providing information for the processor 106. Although the bus 104 is shown to connect directly between the processor 106 and memory 108, other configurations with a different processor/memory and bridge to the bus 104 are also possible implementations.

The SCSI host adapter 110 is coupled between the bus 104 and the SCSI bus 114 to interface and communicate information between the host computer 102 and the SCSI devices 112. Under the current SCSI specifications, the SCSI bus 114 may interconnect up to 7 or 15 target SCSI devices 112 to the host adapter 110 depending on the type of SCSI bus implemented. The target SCSI devices 112 may be devices such as disk drives, tape drives, printers, scanners, optical drives, or any other devices that meet the SCSI specification.

The host adapter 110 provides interface functions and controls communication between the host computer 102 and the SCSI devices 112 using interrupts. Specifically, the host adapter 110 is configured to receive data, address, and control signals from the host computer 102 via the host bus 104 and convert the signals into corresponding SCSI compatible data, address, and control signals. Conversely, the host adapter 104 is also configured to receive SCSI compatible data, address, and control signals from the SCSI devices 112 through the SCSI bus 114 and convert them into corresponding host-bus compatible data, addressing, and control signals. The SCSI host adapter 110 is well known in the art and may be implemented, for example, by using AIC-7890A™ packaged semiconductor device, which is available from Adaptec Inc., of Milpitas, Calif.

As is well known in the art, the communication between the processor 106 and the SCSI devices 112 occurs over various bus phases as defined by SCSI standards. FIG. 2 shows an exemplary timing diagram 200 of SCSI bus tenancies 228 and 230 involved in transferring data between the host adapter 110 and a selected SCSI device 112. For an I/O operation such as reading data from the selected SCSI device 112 to the processor 106, for example, the processor 106 issues a READ command to the host adapter 110. The host adapter 110 then arbitrates for the SCSI bus 114 during an arbitration (ARB) phase 202. After gaining arbitration, the host adapter 110 selects the selected SCSI device 112 as the target in a selection (SEL) phase 204. At this time, the target receives the SCSI ID of the host adapter 110 so that it may reselect the host adapter 110 in a reselect phase.

Once the target has been selected, the host adapter 110 provides, during a message tag (MSG TAG) phase 206, a message to the target identifying the specific command transferred during this selection for future reference by the target. The host adapter 10 then issues the READ command to the selected target during a COMMAND (CMD) phase 208. Then, the communication between the host adapter 110 and the target is typically terminated in a message disconnect (MSG DISC) phase 210 to allow other devices access to the bus. At this time, the SCSI bus enters into a bus free phase 212 indicating the end of the command phase and the availability of the SCSI bus for other devices. The phases 202 to 210 are commonly known as command tenancy 228.

Following the bus free phase 212, the selected SCSI device re-establishes connection with the host adapter 110 to continue the interrupted transaction for transferring data during data tenancy 230. Specifically, the selected SCSI device arbitrates for the bus in an arbitration phase 214 and then reselects the host adapter, which functions as a target, during a reselection (RE-SEL) phase 216. Then, the target sends a reconnect message (MSG RECON) 218 followed by a tag message (MSG TAG) 220 in a message phase. This informs the host adapter 110 which command the following data and status phases are for. Then, data is transferred from the selected SCSI device to the host adapter 110 for use by the host processor during a data phase 222. During a following status (STATUS) phase 224, the SCSI device provides well known status information to the host adapter 110 to indicate success or failure of the command. When the status phase 224 ends, the SCSI device passes a command complete (CMD COMP) message in a command complete phase 226 to indicate that the command has been completed. Following the command complete phase 226, the SCSI bus again enters into another bus free phase. The phases 214 to 226 are often called data tenancy 230.

In conventional computer systems, a host adapter typically generates an interrupt signal at the end of the I/O command complete phase 226 and sends the signal to the processor. This signal informs the processor that the previously requested data have been transferred, for example, via a DMA transaction. The interrupt signal interrupts the processor from its current task and causes the processor to make use of the transferred data.

Given that processors in modern computer systems are highly pipelined, interrupt reception can cause a substantial loss of useful computation time, thereby resulting in reduced system throughput. Hence, it is desirable to reduce the number of interrupts to a minimum required for adequate responsiveness. For SCSI host adapters, this has involved reducing the number of interrupts to a fraction of the number of I/O command completions.

A widely used technique called "interrupt batching" reduces interrupts by batching (i.e., accumulating) a number of I/O command completions together to generate a single interrupt. For example, this approach waits a specified period of time after completion of a task (i.e., command completion) to determine if any more tasks are completed. It may also wait for a specified number of command completions. In either case, this technique monitors the command completions for the specified duration or number. An interrupt is then asserted either, after the expiration of the specified period or upon reaching the specified number of completions, whichever occurs first.

Unfortunately, while this method may reduce the number of interrupts, it often adds substantial latency in processing. For example, in a SCSI bus setting where only up to seven or fifteen target devices are attached to the bus, the rate of command completions is typically low. The low rate of command completion, in turn, means that the accumulation of sufficient number of commands will take a substantial amount of time. Waiting for an interrupt, until sufficient number of commands has been completed, thus delays the execution of programs that require I/O data from the SCSI devices.

Even in the case of generating an interrupt after a specified period of time, the low rate of command completions typically leads to an accumulation of a correspondingly low number of command completions for generating an interrupt. In addition, when no additional commands are completed within the specified period, the generation of interrupt is delayed until the end of the period. Hence, latency results from having to wait for the period to expire. The latencies thus degrade overall performance of the computer system.

In view of the foregoing, what is needed is a method for generating interrupts so that the number of interrupts are substantially reduced without incurring additional latency.

SUMMARY OF THE INVENTION

The present invention fills these needs by providing contention-based methods for generating reduced number of interrupts from a host adapter. It should be appreciated that the present invention can be implemented in numerous ways, including as a process, an apparatus, a system, a device, a method, or a computer readable medium. Several inventive embodiments of the present invention are described below.

In one embodiment, the present invention provides a method for generating reduced number of interrupts upon completing one or more commands. Each interrupt indicates that data has been transferred from a host adapter to a processor. The host adapter is coupled to one or more I/O devices over a bus. One or more I/O commands are received for transferring data between the processor and one or more I/O devices. Then, the contention for the bus among the I/O devices is monitored to determine how many devices are arbitrating for the bus. If only one of the devices is contending for the bus, the one device transfers data to the host adapter. On the other hand, if a plurality of devices is contending for the bus, the plurality of devices are eventually selected and transfers data to the host adapter until all of the plurality of devices have been selected and associated data transferred to the host adapter. An interrupt is then asserted to the processor for the one device or the plurality of devices such that one interrupt is used to indicate that one device or the plurality of devices has transferred data, thereby reducing the number of interrupts when more than one devices are contending for the bus.

In another embodiment, the present invention provides a method for generating an interrupt upon completing one or more commands from a processor. The processor is coupled to a host adapter that is coupled to one or more I/O devices via a bus. The interrupt indicates completion of data transfer to or from one or more I/O devices. The method includes: (a) receiving and completing one or more commands for transferring data to or from one or more I/O devices over the bus; (b) after completing a selected command, waiting a first specified period of time to determine whether a first I/O device is arbitrating to reselect the host adapter for transferring first data to or from the first I/O device in accordance with a first command; (c) if, after the first specified period of time, no I/O device is arbitrating to reselect the host adapter, posting an interrupt to the processor to indicate the completion of previous data transfer completions; and (d) if, after the first specified period of time, the first I/O device is arbitrating to reselect the host adapter; (d1) transferring the first data to or from the first I/O device and waiting for the first data transfer to be completed; and (d2) upon completion of the first data transfer, asserting a first completion of the first command, wherein the completions of the first and selected commands are accumulated for subsequently generating one interrupt to indicate the accumulated completions. Preferably, the waiting is just long enough to determine if there is a reselection in contrast to conventional technique of waiting until another command is completed.

In yet another embodiment, a method is disclosed for generating an interrupt upon completing one or more commands from a processor. The interrupt indicates completion of data transfer to or from a host adapter, which is coupled to one or more I/O devices over a bus. One or more I/O commands for transferring data to or from one or more I/O devices are received and completed. Upon completing each command, the host adapter waits a specified iterations of a loop counter to determine whether the host adapter has been re-selected by an I/O device for transferring data to or from the I/O device. If the host adapter is re-selected by the I/O device, data is transferred to or from the reselecting I/O device without generating an interrupt so as to batch data transfer completions. If the host adapter is not reselected, an interrupt is posted to the processor to indicate the accumulated data transfer completions. Preferably, the loop counter is reset whenever the interrupt is posted.

By thus monitoring the bus for contention after each command completion, the present invention determines whether another command may be completed within a short period of time. If arbitration for the bus is uncontested, then other command completions are unlikely to occur within the short period of time. In this case, the interrupt is posted immediately to indicate the availability of data for transfer. On the other hand, if arbitration for the bus is contested, then other command completions are substantially likely to occur within the short period of time. In such instance, the host adapter waits until such commands are completed before posting an interrupt for the completed commands. In this manner, the number of interrupts and associated latency are reduced to a substantial degree. Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

The present invention, contention-based methods for generating reduced number of interrupts from a host adapter, is described. It will be obvious, however, to one skilled in the art, that the present invention may be practiced without some or all of these specific details. In other instances, well known process operations have not been described in detail in order not to unnecessarily obscure the present invention.

Figure 3:
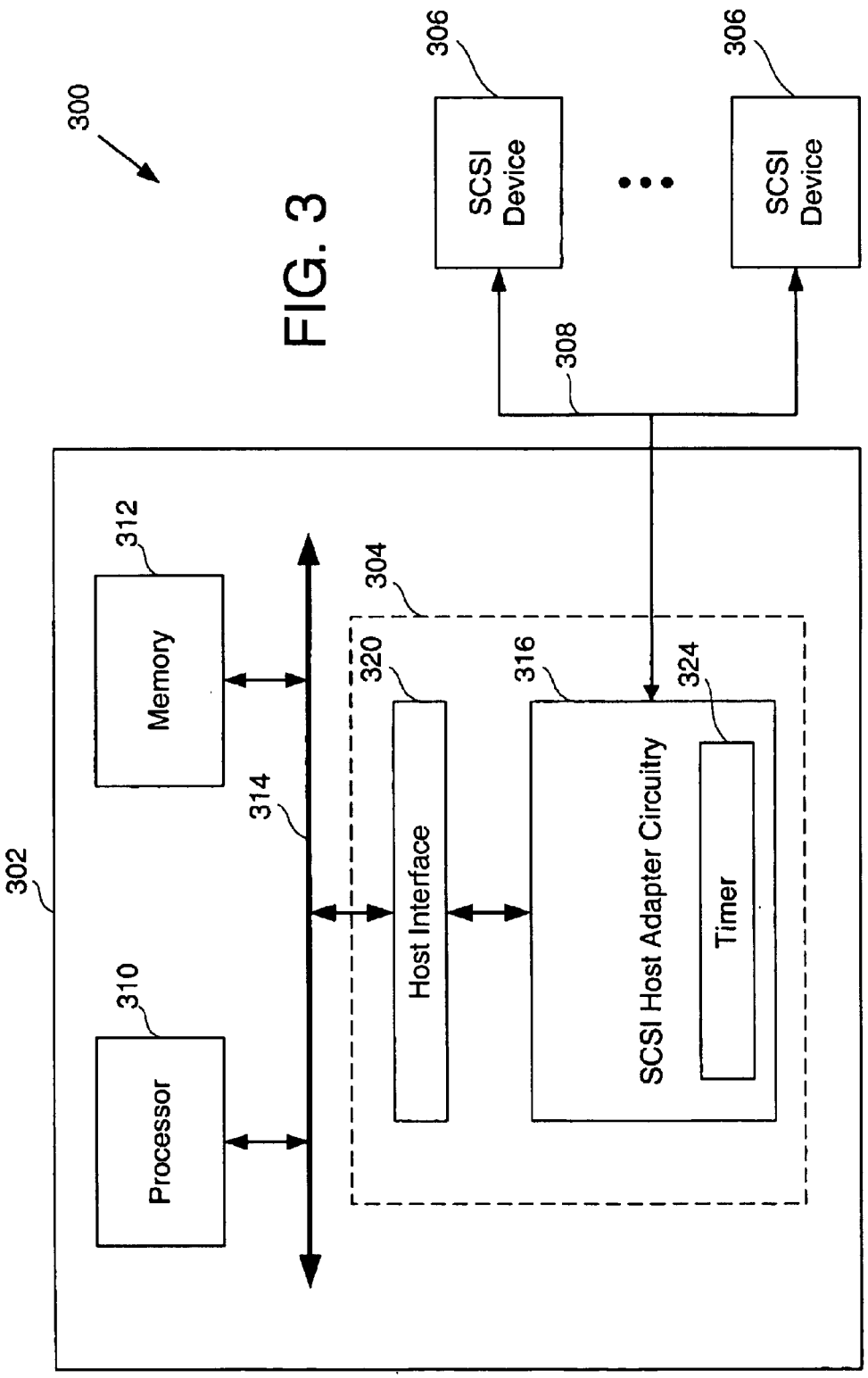
FIG. 3 illustrates a block diagram of an exemplary computer system 300 in which the present invention may be implemented in accordance with one embodiment of the present invention.

FIG. 3 illustrates a block diagram of an exemplary computer system 300 in which the present invention may be implemented in accordance with one embodiment of the present invention. The computer system 300 includes a host computer 302, a SCSI bus 308, and one or more SCSI devices 306. The host computer 302 in the computer system 300 includes a host processor 310 (e.g., CPU), a memory 312, and a SCSI host adapter 304, which are coupled to a host bus 314. The host bus 314 is an internal bus that may be implemented by any suitable bus such as PCI bus, ISA bus, etc.

The SCSI host adapter 304 includes a SCSI host adapter circuitry 316 and a host interface 320. The host interface 320 provides a physical connection between the host adapter circuitry 316 and the rest of the host computer 302 through the host bus 314. Although the host bus 314 is shown to connect directly between the processor 310 and memory 312, other configurations with a different processor/memory and bridge to the bus 314 may also be implemented within the scope of the present invention. It should be noted that while the host adapter 304 may function as either an initiator or a target, it operates in an initiator mode to generate interrupts.

The host adapter circuitry 316 is coupled to one or more SCSI devices 306 by means of the SCSI bus 308. It should be noted that the computer system 300 may include any suitable number of SCSI devices depending on the type of SCSI bus implemented. Each of the SCSI devices is preferably assigned a unique ID that indicates its priority among the SCSI devices. The SCSI devices 306 may include, but not limited to, devices such as disk drives, tape drives, printers, scanners, optical drives, or any other devices that meet the SCSI specifications. Although the present invention is illustrated in terms of SCSI devices and a SCSI bus, it may also be implemented with any suitable type of buses and bus devices including peripheral bus and devices, I/O bus and devices, and the like.

The host adapter circuitry 316 interfaces and controls communication of commands and data between the host computer 302 and the SCSI devices 306. In a preferred embodiment, the host adapter 304 is configured to communicate with the host memory 312 using well known direct memory access (DMA) transactions. In this case, an interrupt is generated to indicate completion of one or more data transfers between SCSI devices and the host main memory 312.

The SCSI host adapter circuitry 316 includes a timer 324, either in hardware or software form, to implement a waiting feature. The SCSI host adapter circuitry 316 uses the timer 324 for counting a specified period of time after a command completion or upon posting an interrupt to the processor 310. That is, the timer 324 keeps track of the time passage and signals the host adapter circuitry 316 when the specified period of time has elapsed. In addition to the timer 324, the present invention may also employ any suitable hardware or software means to implement waiting features such as counters, microcode idle loops, loop counters, clocks, etc.

In contrast to conventional techniques of generating interrupts by monitoring command completions upon completing a command to generate an interrupt, the host adapter 304 generates an interrupt by monitoring contention for the SCSI bus upon completing a command in accordance with one embodiment of the present invention. Specifically, when a command has been completed, the host adapter 304 checks the SCSI bus to determine if any SCSI device 306 is arbitrating for the bus to re-select the host adapter. If no device is contending for the bus to re-select the host adapter, the host adapter generates and posts an interrupt to the processor 310. However, if one or more devices 306 are contending for the bus to re-select the host adapter, the host adapter generates an interrupt upon completing commands for these devices. In this manner, one interrupt is generated for a batch of command completions. By thus monitoring contentions instead of command completions, the present invention substantially reduces latency associated with conventional approaches. This is particularly advantageous in SCSI bus environment where the number of I/O command completions is often not sufficiently high in a given time period.

Figure 1:
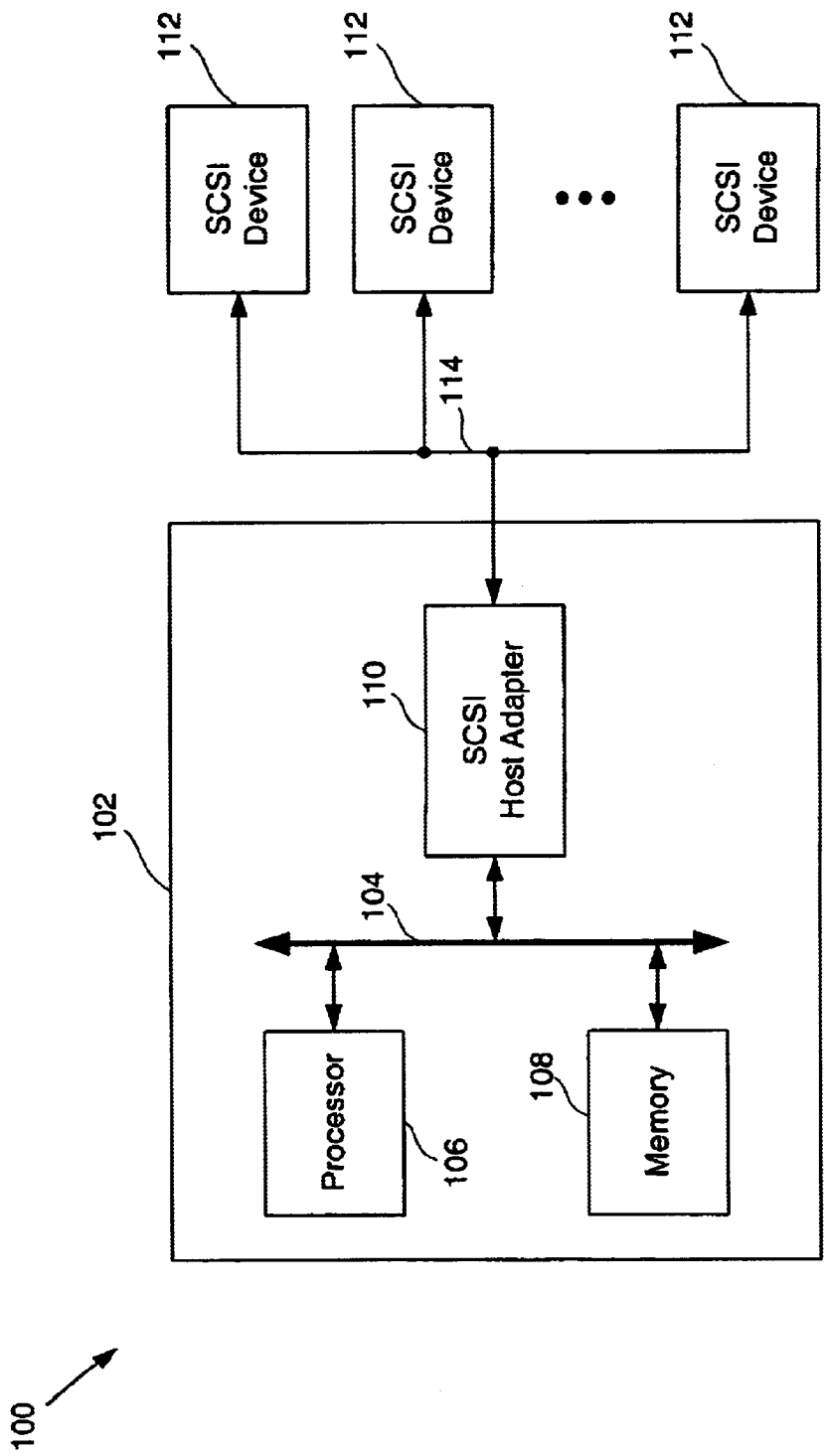
FIG. 1 illustrates a block diagram of a computer system having a host computer coupled to a plurality of SCSI devices by means of a SCSI bus.
Figure 2:
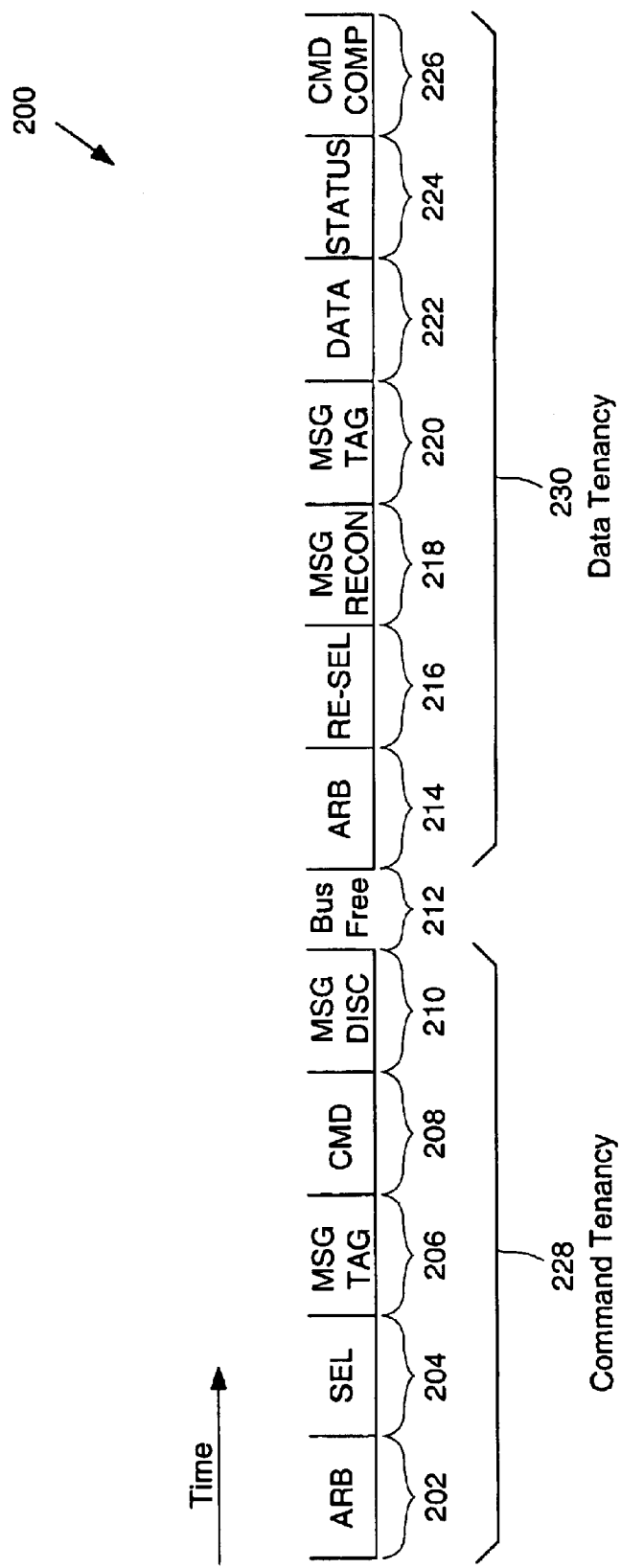
FIG. 2 shows a timing diagram of SCSI phases involved in transferring data between a processor and a selected SCSI device.
Figure 4:
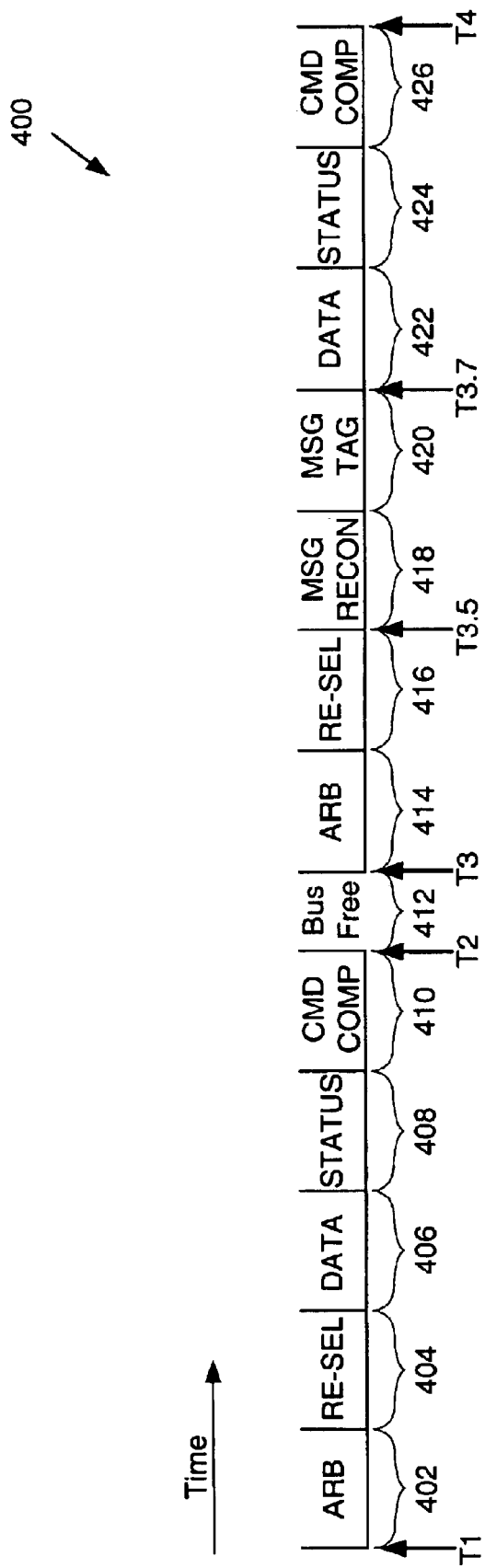
FIG. 4 illustrates an exemplary timing diagram of SCSI phases involved in transferring data between the host adapter and one or more SCSI devices in accordance with one embodiment of the present invention.

FIG. 4 illustrates an exemplary timing diagram 400 of SCSI phases involved in transferring data between the host adapter 304 and one or more SCSI devices 306 in accordance with one embodiment of the present invention. Starting at time T1, one or more SCSI devices arbitrate for the SCSI bus during an arbitration (ARB) phase 402. Among the SCSI devices, a device which has the highest priority as indicated by its SCSI ID number is then selected from the devices and granted arbitration. Upon winning the arbitration, the selected SCSI device re-selects the host adapter during a re-selection (RE-SEL) phase 404. At this point, it is assumed that the selected SCSI device has already received a data transfer command during a previous command tenancy as described in FIG. 2. In addition, a message phase, consisting of a reconnect message and a tag message (not shown), typically follows the RE-SEL phase 404.

Once the host adapter has been re-selected, the selected SCSI device transfers data to the host adapter during a data (DATA) phase 406. The selected SCSI device then provides, during a status (STATUS) phase 408, well known status information to the host adapter indicating success or failure of the command. After the status phase 408, the SCSI device transmits a command complete signal in a command complete message (CMD COMP) phase 410 to indicate that the command has been completed. The end of the command completion phase coincides with time T2, where the bus free phase 412 begins and lasts until time T3.

At time T3, another arbitration phase 414 then begins and one or more SCSI devices arbitrate (i.e., contend) for the bus to re-select the host adapter for transferring data. Specifically, a SCSI device having the highest priority is selected during the arbitration (ARB) phase 414 and provided with access to the bus. Upon gaining access to the bus, the SCSI device enters reselection (RE-SEL) phase 416 for reselecting the host adapter. At the end of the reselection phase 416, which coincides with time T3.5, a message phase is entered during which a message reconnect (MSG RECON) 418 followed by a tag message (MSG TAG) 420 is sent. This message phase is used to inform the host adapter which command the following data and status phases are for. The end of the message phase coincides with time T3.7. Then, data is transferred from the SCSI device to the host adapter during a data (DATA) phase 422. During a following status (STATUS) phase 424, the SCSI device provides status information to the host adapter to indicate success or failure of the command. Then, the SCSI device passes a command complete message during a command complete (CMD COMP) phase 426. At the end of the command complete phase 426 at time T4, the SCSI bus enters into another bus free phase.

In accordance with one embodiment, the present invention monitors the SCSI bus for contention during the arbitration phase 414 after time T3 to determine the number of devices that are arbitrating for the bus to reselect the host adapter. If more than one device is determined to be arbitrating for the bus, then the devices are selected in accordance with the priority associated with each device. For example, SCSI devices including the host adapter are typically assigned a SCSI ID that specifies the priority of each device. In typical SCSI standards, the device with the highest SCSI ID is given the highest priority. In such a scheme, the host adapter is usually designated by the highest SCSI ID number for the highest priority. Other devices are then assigned lower SCSI ID numbers in accordance with desired device priority.

Based on the unique SCSI ID numbers, the device with the highest priority wins a given arbitration phase and is allowed to re-select the host adapter for transferring data. When that transfer is finished, the remaining devices will participate in a new arbitration phase. When only one device is left arbitrating for the bus, the device is allowed to re-select the host adapter and transfer its data to the host adapter. At time T4, where a command completion is indicated, an interrupt is generated and posted to the processor to indicate that data has been transferred into the host memory 314 via a DMA transaction.

In a preferred embodiment, when a command is completed at time T2, the present invention waits for a predetermined period of time to determine if a second device attempts to arbitrate for the bus for re-selecting the host adapter. The specified waiting period is kept to a minimum time required to acquire a re-selection if the device was ready and latches onto the bus immediately. In effect, the device is ready before the current transfer has finished and contends silently for the bus. The wait time interval is a relatively short, typically ranging, for example, between 5 to 7 $\mu$s. Thus, in contrast to conventional techniques that typically waited a much longer time to see if another transfer completion occurs, the present invention saves improves performance substantially by waiting just long enough to see if there is a reselection.

The host adapter may implement the waiting features of the present invention by any suitable hardware or software means adapted to keep track of time such as a timer, counter, idle loop counter, and the like. In particular, the predetermined waiting period may be programmable via a timer or loop counter for desirable latency and may range from 1 $\mu$s to 30 $\mu$s. For example, the timer 324 of FIG. 3, which is configured to count for the predetermined period of time, may be reset or initialized whenever a command is completed. Preferably, the timer 324 is set to count about 2 $\mu$s from time T2 before checking at time T3 and is further set to count about 5 $\mu$s from Time T3 before checking at time T3.5. In contrast, when an idle loop of a sequencer is used, a specified number of iterations of the idle loop may be used to implement the waiting.

By way of example, the host adapter waits for about 2 $\mu$s (microsecond) until time T3 before determining if another arbitration is occurring immediately after a command completion. If so, it further waits about 5 $\mu$s until T3.5 and determines whether the host adapter is reselected for another data transfer. If yes, the host adapter waits until time T3.7 at the end of MSG TAG phase 420 to determine whether the command may be completed within an acceptably short time. If an answer to any of these determinations is no, then the host adapter stops waiting and posts an interrupt immediately from the command completion.

In another embodiment, the host adapter may only check whether a device is arbitrating to reselect the host adapter at time T3.5. When implemented using an idle loop of a sequencer, the idle loop may be reset when an interrupt is posted. This method provides benefits in that no extra hardware is required. Furthermore, by setting the loop count long enough to last through several arbitration-selection times and freezing the count each time the host adapter is reselected, several interrupts may be combined into one interrupt.

The latency may be further reduced in some embodiments of the present invention. For example, if a device actually were contending for the bus, it may start an arbitration phase about 1.2 $\mu$s after the previous transfer completed with a bus free phase. Thus, the host adapter waits only 2 to 3 $\mu$s and posts the interrupt if no arbitration had started. If an arbitration does start, the host adapter may wait an additional 5 to 6 $\mu$s to determine that it was being reselected. It should be appreciated that the present invention may utilize more than one host adapter on a single SCSI bus and if another host adapter is selected, the original host adapter stops waiting and posts an interrupt immediately.

In another embodiment, when the reconnect and tag messages are received in MSG RECON and MSG TAG phases 418 and 420, the present invention may determine the probability of the new data transfer actually completing during this data tenancy and continue waiting only if the probability was deemed sufficiently high. The probability of completion may be determined, for example, by setting a bit in a control structure associated with the command which indicated a high probability based on the length of the transfer. For instance, a transfer of 8 kbytes or less may be considered short and thus the bit may be set; otherwise the bit is not set. Alternatively, the host adapter may determine the actual amount of data remaining to be transferred and continue waiting if the amount is less than the typical amount transferred during a given tenancy. Another method would be to obtain other indicia of the amount of data left to be transferred such as the number of scatter/gather elements left, which are well known in the art.

Figure 5:
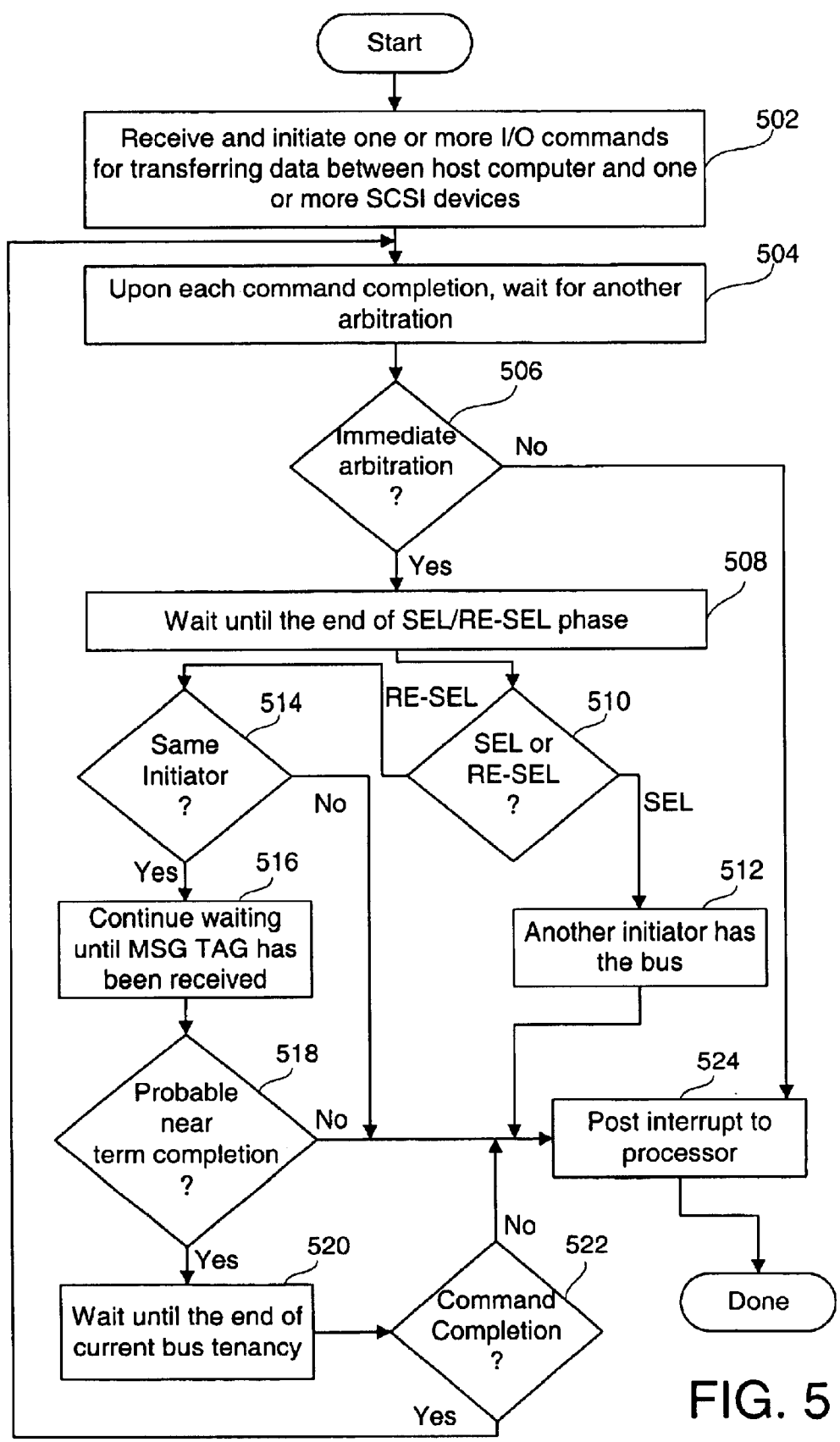
FIG. 5 shows a flowchart of an exemplary method for generating reduced number of interrupts in accordance with one embodiment of the present invention.

FIG. 5 illustrates a flowchart of an exemplary method for generating reduced number of interrupts in accordance with one embodiment of the present invention. In this illustrated method, one or more I/O commands for transferring data between a host computer and one or more SCSI devices are received and initiated in operation 502. Upon each command completion, the host adapter monitors the bus for another arbitration in operation 504. Then in operation 506, it is determined if another arbitration occurs immediately (e.g., at time T3). If the arbitration occurs immediately after the command completion, the method proceeds to operation 508, where the host adapter waits until the end of SEL or RE-SEL phase. However, if arbitration does not occur immediately, the method proceeds to operation 524 to post an interrupt to the processor.

At the end of the SEL or RE-SEL phase (i.e., at time T3.5), it is determined whether a SEL phase or RE-SEL phase occurred in operation 510. If a SEL phase has occurred, it means that some initiator, possibly including the specific host adapter implementing the algorithm shown in this flow chart, has obtained the bus as shown in operation 512. In this case, no timely command completion can be expected, and the host adapter proceeds to operation 524 to post an interrupt to the processor.

However, if the host adapter has been reselected, the method proceeds to operation 514, where it is determined whether the initiator is the same. If the phase is reselection, but a different initiator ID is used, then an interrupt is posted to the processor in operation 524. Otherwise, the host adapter continues to wait, in operation 516, until MSG TAG has been received at the end of a MSG TAG phase, which coincides with time T3.7. Then, it is determined, in operation 518, whether near term completion is probable. For example, the probability of near term completion may be determined by checking the state of the reconnecting transaction to see if there is a high probability of a near term completion. If a near term completion is not probable, an interrupt is posted to the processor in operation 524.

On the other hand, if a near term completion is probable, the host adapter waits until the end of the current bus tenancy (i.e., data tenancy) in operation 520. At the end of the current bus tenancy, it is determined whether the command has been completed in operation 522. If so, the method proceeds back to operation 504 to wait for another arbitration. This enables accumulation of command completions so that one interrupt is generated for accumulated completions. However, if the command has not been completed, this means that the command ended in a disconnect so that another reselection will be needed. Thus, the method proceeds to post an interrupt to the processor in operation 524.

In a preferred embodiment, the present invention employs either a timer or a counter may be employed in a host adapter. The timers or idle loop counters, in one embodiment, may be initialized at command completion time. Each command completion resets the timer or counter regardless of whether an interrupt occurred. This allows an arbitrarily large number of potential interrupts may be accumulated if successive reselections with transfer completion occurred one immediately after another. However, it may delay the first interrupts an arbitrarily long amount of time. An alternative method resets the timer or counter after posting an actual interrupt. This limits the number of iterations of the idle loop, for example, and hence the maximum number of potential interrupts that can be accumulated before an actual interrupt is posted. For example, if the counter is set to a number three times the number of iteration that would occur between the beginning of BUS FREE and the determination of reselection, then a maximum of three minimally spaced reselections could take place before an interrupt was posted. Alternatively, a timer may be used to freeze the count with each reselection and resume the count when the next BUS FREE phase occurred.

Figure 6:
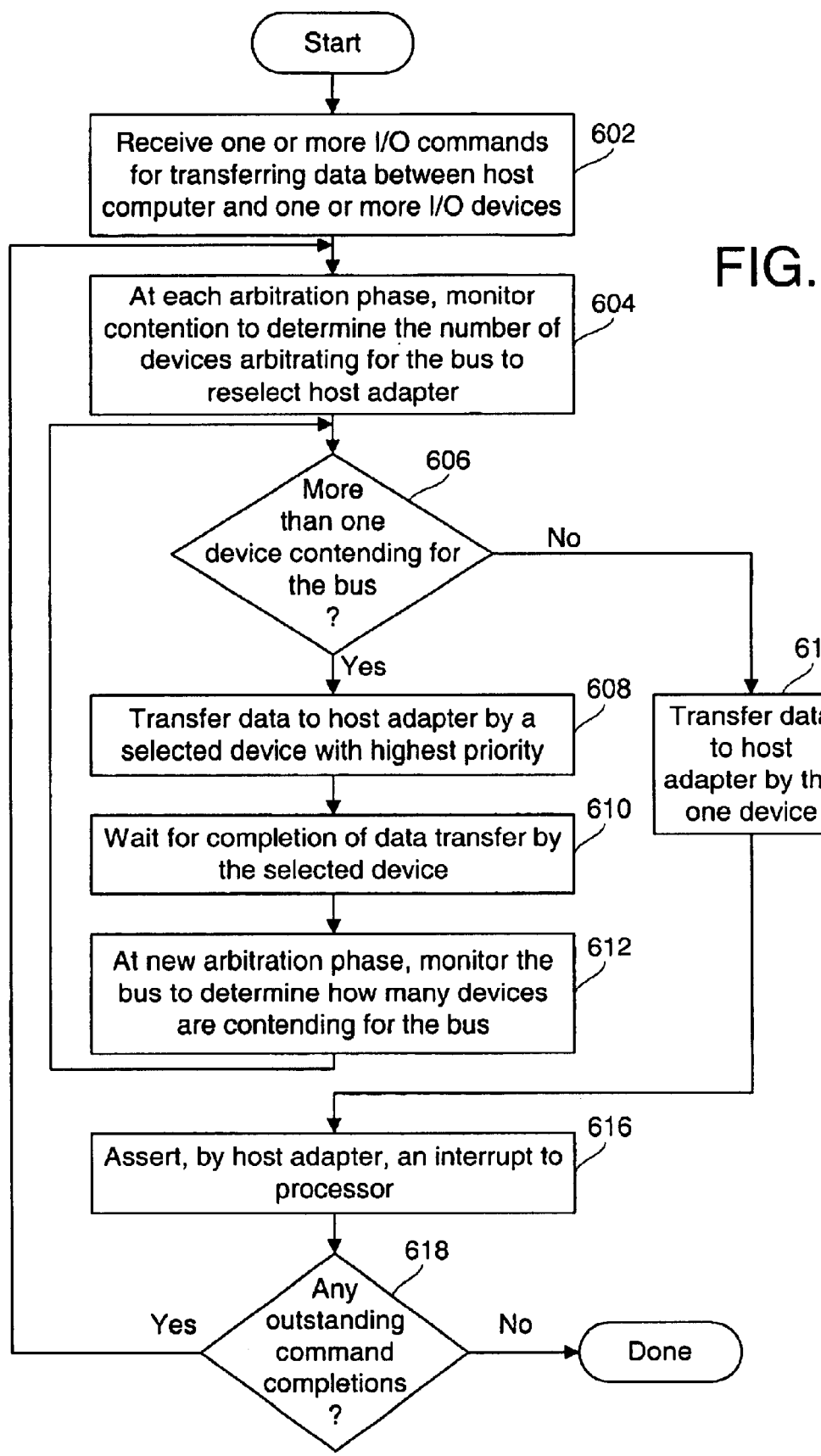
FIG. 6 shows a flowchart of an exemplary method for generating reduced number of interrupts in accordance with another embodiment of the present invention.

FIG. 6 shows a flowchart of an exemplary method for generating reduced number of interrupts in accordance with another embodiment of the present invention. In this method, one or more I/O commands are received for transferring data between a host computer and one or more I/O devices in operation 602. Then, at each arbitration phase after a command completion, the host adapter monitors SCSI bus contention, in operation 604, to determine the number of devices arbitrating for the bus to re-select the host adapter. Next in operation 606, it is determined whether more than one device are contending for the bus. If so, data is transferred to the host adapter by a selected device having the highest priority (i.e., highest SCSI ID number) in operation 608. Then in operation 610, the SCSI devices including the host adapter wait for the completion of data transfer by the selected device. The completion of data transfer will be indicated by a command completion message asserted over the bus.

Then in operation 612, after the command associated with the first selected device has been completed, another arbitration phase is entered and the next SCSI device having the highest priority is selected and allowed to transfer data to the host adapter. The next SCSI device will be the device having the highest priority among the SCSI devices that are arbitrating for the bus. It should be noted that an arbitration occurs in both operations 604 and 612. The method then proceeds back to operation 606 to determine whether more than one device is contending for the bus.

If, not more than one SCSI device is determined to be contending for the bus in operation 606, the single device is allowed to transfer data to the host adapter in operation 614. Then, the host adapter generates an interrupt and posts the interrupt to the processor to indicate the completion of data transfer in operation 616. After the interrupt has been posted, it is determined if any outstanding commands need to be completed in operation 618. If so, the method proceeds back to operation 604 to monitor contention to the bus. Otherwise, the method terminates. It should be appreciated that the methods of the present invention work equally well for write operations (i.e., data from host adapter) as well as read operations (i.e., data to host computer).

The method described in FIG. 6 is particularly suited for situations where many devices are arbitrating for the bus during the same arbitration phase. Under many workloads, however, a plurality of devices do not often contend for the bus during the same arbitration phase. In such instances, the method in FIG. 6 may not significantly reduce the number of interrupts.

Figure 7:
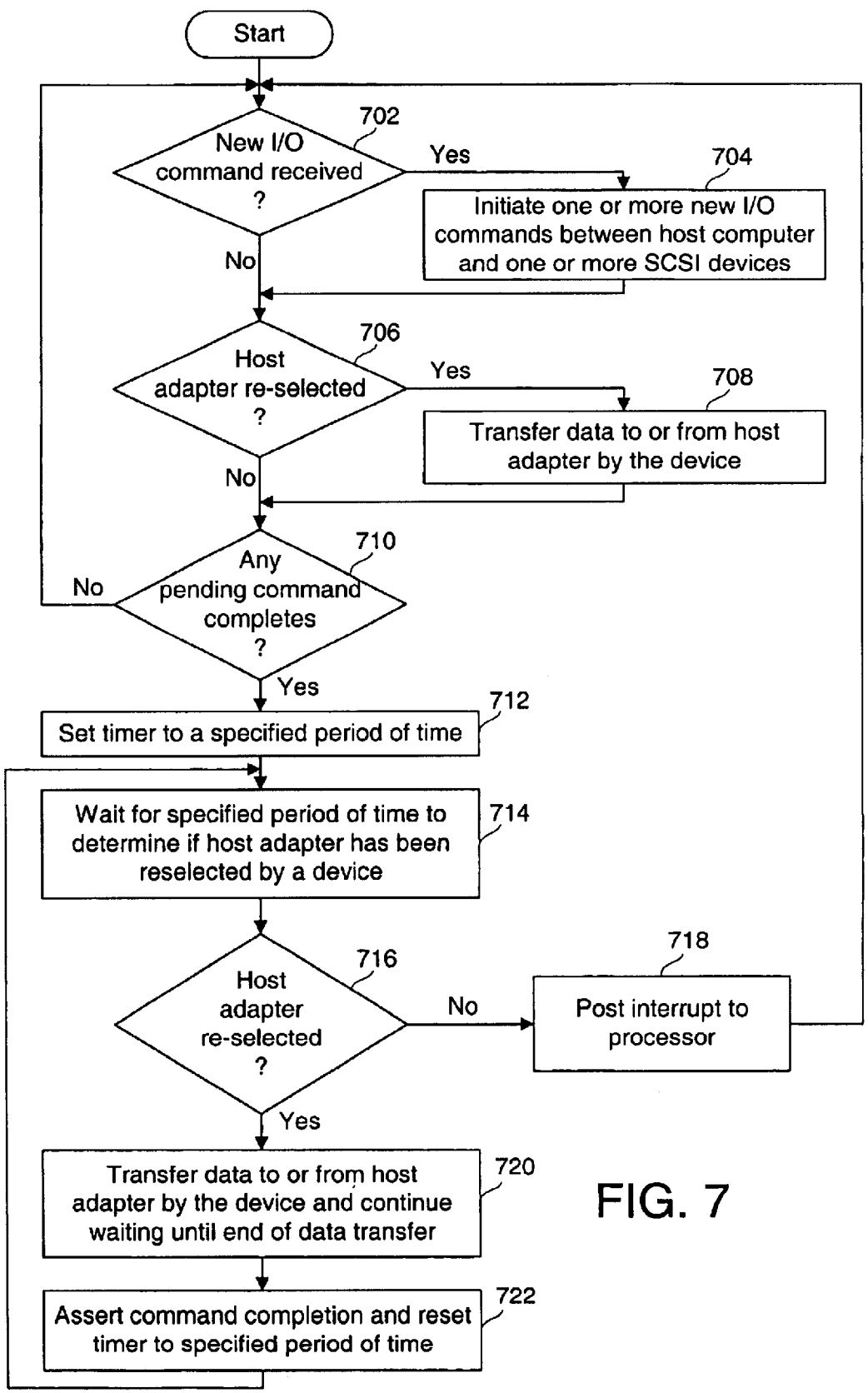
FIG. 7 shows a flowchart of an exemplary method for generating reduced number of interrupts by using a timer in accordance with one embodiment of the present invention.

FIG. 7 shows a flowchart of an exemplary method for generating reduced number of interrupts by using a timer in accordance with one embodiment of the present invention. Initially, it is determined whether one or more new I/O commands have been received in operation 702. If so, the method proceeds to operation 704 to initiate one or more new I/O commands between host computer and one or more SCSI devices. The method then proceeds to operation 706, where it is determined whether the host adapter has been re-selected by a device. If so, I/O data is transferred between the host adapter and the re-selecting device in operation 708.

After transferring the data or if the host adapter has not been re-selected, it is determined whether there are any pending command completions in operation 710. If there is no pending command completions, the method proceeds back to operation 702 to receive one or more new I/O commands. Otherwise, a timer (e.g., clock, counter, etc.) is set to a specified period of time in operation 712.

Then in operation 714, the host adapter waits for the specified period of time to determine whether the host adapter has been re-selected by a SCSI device. Preferably, the host adapter waits and checks for arbitration, reselection, and probability of near term completion at times T3, T3.5, and T3.7, respectively, as described above. If the host adapter is determined to have been re-selected in operation 716 by the SCSI device, the method proceeds to operation 720, where the SCSI device transfers data to or from the host adapter and continues waiting until the end of the data transfer. When the data transfer is completed, a command completion is asserted and the timer is reset for the specified period of time in operation 722. The method then proceeds back to operation 714 to wait for the specified period of time. In this way, the completed data transfer is accumulated without generating an interrupt.

However, if it is determined, in operation 716, that the host adapter has not been re-selected, the host adapter generates and posts an interrupt in operation 718 for all previously accumulated completions. Thus, the number of interrupts generated and posted to the processor is significantly reduced. The method then proceeds back to operation 702 to receive one or more new I/O commands.

Figure 8:
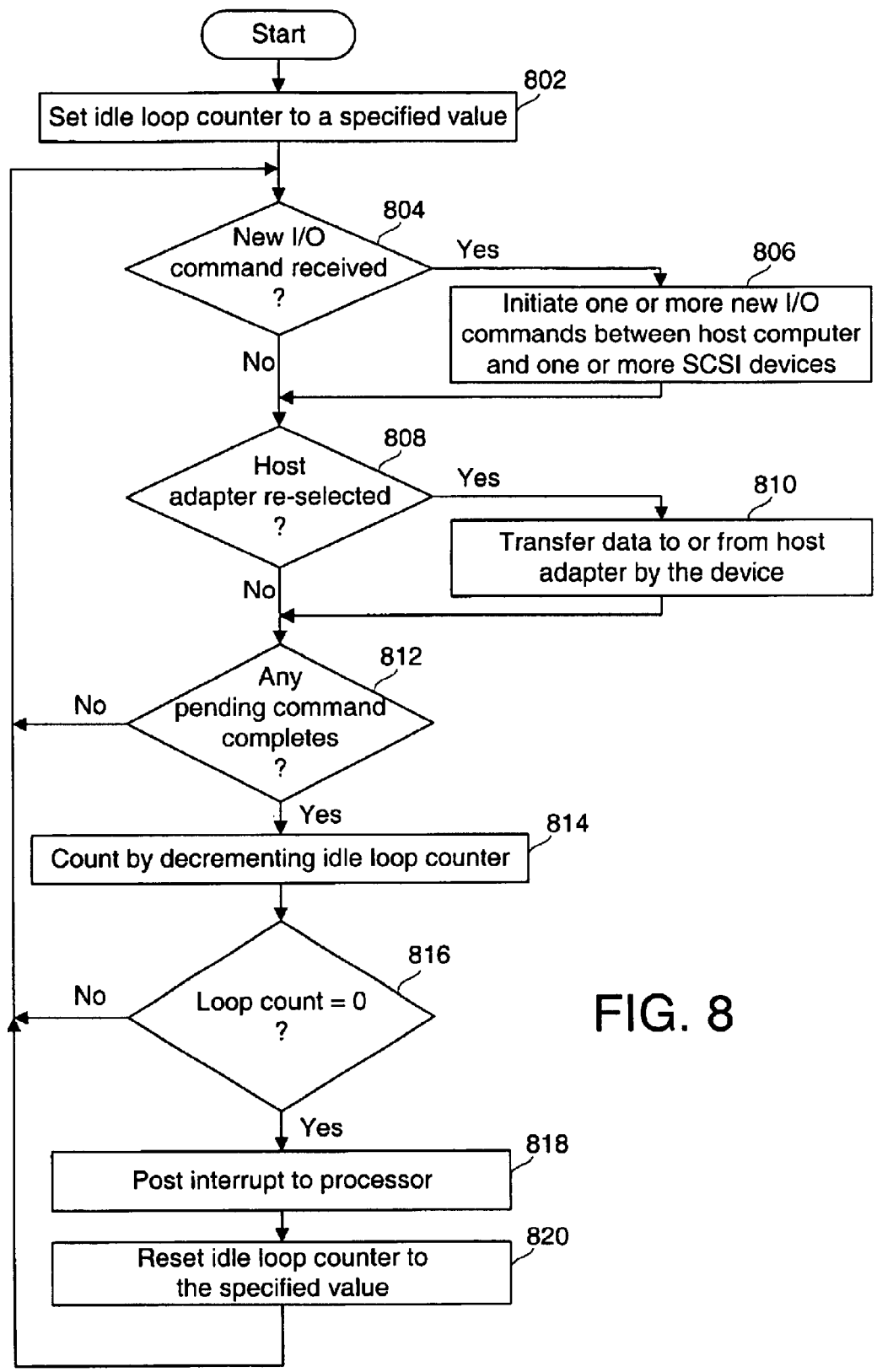
FIG. 8 shows a flowchart of an exemplary method for generating reduced number of interrupts by using a loop counter in accordance with another embodiment of the present invention.

FIG. 8 shows a flowchart of an exemplary method for generating reduced number of interrupts by using a loop counter in accordance with another embodiment of the present invention. In operation 802, an idle loop counter is set to a specified value upon power up. Then in operation 804, it is determined whether one or more new I/O commands have been received. If so, the method proceeds to operation 806 to initiate one or more new I/O commands between host computer and one or more SCSI devices.

The method then proceeds to operation 808, where it is determined whether the host adapter has been re-selected by a device. If so, data is transferred between the host adapter and the re-selecting device in operation 810. After transferring the data or if the host adapter has not been re-selected, it is determined whether there are any pending command completions in operation 812. If there is no pending command completions, the method proceeds back to operation 804 to receive one or more new I/O commands.

However, if there are any pending command completions, the idle loop counter counts by decrementing in operation 814. After decrementing the counter, it is determined whether the loop count of the idle loop counter is equal to zero in operation 816. If not, the method proceeds back to operation 804 to receive one or more new I/O commands.

On the other hand, if the loop count in the idle loop counter is zero, an interrupt for one or more accumulated completions is posted to the processor in the host computer in operation 818. Upon posting the interrupt, the idle loop counter is reset to the specified value in operation 820. The method then proceeds back to operation 804 to receive one or more new I/O commands.

Thus, the present invention reduces high latency associated with fixed number and/or time approaches by invoking an interrupt when bus activity indicates that another completion may not be imminent. The monitoring of the SCSI bus contention allows the determination of whether another command may be completed within a short time. If arbitration were uncontested, the present invention assumes that other command completions are not imminent and should not be waited for before posting an interrupt. Accordingly, the host adapter then waits for only the additional commands to be completed to invoke an interrupt, thereby substantially reducing the number of interrupts and associated latencies.

The present invention, contention-based methods for generating reduced number of interrupts from a host adapter, is thus described. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. In a computer system, a method for generating interrupts upon completing one or more commands from a processor, each interrupt indicating to said processor that data has been transferred to or from a host adapter, which is coupled to one or more I/O devices over a bus, said method comprising:

receiving one or more I/O commands for transferring data between said processor and one or more I/O devices, each I/O device being associated with a unique priority;

monitoring contention for said bus among said I/O devices to determine how many I/O devices are arbitrating for said bus;

if only one of said I/O devices is contending for said bus, transferring data to or from said host adapter by said one of said I/O devices;

if a plurality of I/O devices is contending for said bus, selecting said plurality of I/O devices, one I/O device at a time in accordance with said priorities associated with said I/O devices, and transferring data to or from said host adapter, until all of said plurality of devices have been selected and data for all I/O devices has been transferred; and asserting an interrupt to said processor such that one interrupt is used to indicate that said data has been transferred to or from said one I/O device or said plurality of I/O devices, thereby reducing said number of interrupts when more than one I/O devices are contending for said bus.

2. The method as recited in claim 1, wherein said contention is monitored during an arbitration phase of said bus.

3. The method as recited in claim 1, wherein said plurality of I/O devices are selected one at a time and one after another and wherein said data for said plurality of I/O devices are transferred sequentially.

4. The method as recited in claim 1, wherein each of said I/O devices is characterized by said unique priority, wherein said operation of sequentially selecting said plurality of devices and transferring data farther comprises:
   selecting an I/O device having a highest priority among said plurality of I/O devices; and
   transferring data to said host adapter by said selected I/O device.

5. The method as recited in claim 4, wherein said operation of sequentially selecting said plurality of I/O devices and transferring data further comprises:
   repeating said operations of selecting the I/O device and transferring data until all of said plurality of I/O devices have been selected and associated data transferred to said host adapter.

6. The method as recited in claim 1, wherein said bus is a SCSI bus and said I/O devices are SCSI devices.

7. The method as recited in claim 1, wherein said operation of asserting said interrupt further comprises:
   generating said interrupt for indicating said completion of data transfer between said host and said one I/O device or said plurality of I/O devices; and
   posting said interrupt to said processor to indicate said completion of data transfer.

8. The method as recited in claim 1, wherein said contention is monitored to determine how many I/O devices are arbitrating for said bus for a reselecting phase with said host adapter.

9. A method for generating an interrupt upon completing one or more commands from a processor, said processor being coupled to a host adapter that is coupled to one or more I/O devices via a bus, said interrupt indicating completion of data transfer to or from one or more I/O devices, said method comprising:
   a) receiving and completing one or more commands for transferring data to or from one or more I/O devices over said bus;
   b) after completing the command, waiting a first specified period of time to determine whether a first I/O device is arbitrating to initiate a reselect phase with said host adapter for transferring first data to or from said first I/O device in accordance with a first command;
   c) if, after said first specified period of time, the first I/O device is not arbitrating to reselect said host adapter, posting an interrupt to said processor to indicate said completion of previous data transfer completions; and
   d) if, after said first specified period of time, said first I/O device is arbitrating to reselect said host adapter;
   d1) transferring said first data to or from said first I/O device and waiting for said first data transfer to be completed; and
   d2) upon completion of said first data transfer, asserting a first completion of said first command, wherein said completions of said first and selected commands are accumulated for subsequently generating one interrupt to indicate said accumulated completions.

10. The method as recited in claim 9, further comprising:
   repeating operations b) through d) such that when no I/O device is arbitrating to reselect said host adapter, said interrupt is generated to indicate completions of said accumulated completions.

11. The method as recited in claim 10, wherein said host adapter includes a timer configured to keep track of said first specified period of time and wherein said first specified period of time spans a duration to enable determination if said first I/O device is reselecting said host adapter.

12. The method as recited in claim 11, wherein said timer is reset whenever said command is completed.

13. The method as recited in claim 9, wherein said operation b) further comprises:
   waiting a bus free period of time to determine whether said first I/O device is arbitrating for said bus;
   if the first I/O device is not arbitrating for said bus, posting said interrupt to said processor to indicate said completion of said previous data transfer completions;
   if said first I/O device is arbitrating for said bus, waiting until said end of a selection or reselection phase to determine whether said first device is selecting or reselecting said host adapter;
   if said first I/O device is selecting said host adapter, posting said interrupt to said processor to indicate said completion of said previous data transfer completions.

14. The method as recited in claim 9, wherein said first specified period of time comprises a second wait period, wherein said second wait period is a bus free cycle following said completion of each data transfer command such that whether said first I/O device is arbitrating for said bus is determined immediately following said bus free cycle.

15. The method as recited in claim 9, wherein said first specified time is only long enough to determine whether said host adapter has been re-selected by said first I/O device.

16. The method as recited in claim 9, wherein said operation of waiting said first specified period of time is implemented by using a loop counter configured to keep track.

17. The method as recited in claim 16, wherein said loop counter is reset upon said completion of each command.

18. The method as recited in claim 9, wherein said bus is a SCSI bus and said I/O devices are SCSI devices.

19. The method as recited in claim 9, wherein said interrupt indicates completion of data transfer between a main memory and said one or more I/O devices.

20. A method for generating an interrupt upon completing one or more commands from a processor, said interrupt indicating completion of data transfer to or from a host adapter, which is coupled to one or more I/O devices over a bus, said method comprising:
   a) receiving and completing one or more I/O commands for transferring data to or from one or more I/O devices;
   b) upon completing each command, waiting a specified iterations of a loop counter to determine whether said host adapter has been selected again by said I/O device for transferring data to or from said I/O device;
   c) if said host adapter is re-selected by said I/O device, performing said data transfer to or from said reselecting I/O device without generating an interrupt so as to batch one or more data transfer completions; and
   d) if said host adapter has not been selected again, posting said interrupt to said processor to indicate said batched data transfer completions.

21. The method as recited in claim 20, wherein said host adapter includes said loop counter and wherein said loop counter is set to said specified iterations.

22. The method as recited in claim 21, wherein said loop counter is reset to said specified iterations upon posting said interrupt to said processor.

23. The method as recited in claim 22, wherein said loop counter stops counting iterations when said host adapter is reselected until said data transfer is terminated.

24. The method as recited in claim 21, wherein said interrupt is posted when said loop count of said loop counter exceeds said specified iterations.

25. The method as recited in claim 20, wherein said loop counter is an idle loop counter adapted to count idle loop iterations.

26. The method as recited in claim 20, wherein whether said host adapter has been reselected is determined at an end of a selection or reselection phase.

27. The method as recited in claim 20, wherein said bus is a SCSI bus and said I/O devices are SCSI devices.

28. The method as recited in claim 20, wherein said interrupt indicates completion of data transfer between a main memory and said one or more I/O devices.

* * * * *